(12) United States Patent
Lin et al.

(10) Patent No.: US 10,143,054 B2
(45) Date of Patent: Nov. 27, 2018

(54) LIGHT-EMITTING DIODE DRIVER

(71) Applicant: Dazzo Technology Corporation, Taipei (TW)

(72) Inventors: Shen-Xiang Lin, Taipei (TW);
Hsuan-Hao Chien, Taipei (TW);
Chih-Jen Hung, Taipei (TW)

(73) Assignee: DAZZO TECHONOLOGY CORPORATION, Taipei (TW)

( * ) Notice: Subject to any disclaimer, the term of this patent is extended or adjusted under 35 U.S.C. 154(b) by 0 days.

(21) Appl. No.: 15/808,636

(22) Filed: Nov. 9, 2017

(65) Prior Publication Data
US 2018/0132321 A1    May 10, 2018

Related U.S. Application Data

(60) Provisional application No. 62/420,023, filed on Nov. 10, 2016.

(51) Int. Cl.
*H05B 33/08* (2006.01)
*H05B 37/02* (2006.01)

(52) U.S. Cl.
CPC ..... *H05B 33/0845* (2013.01); *H05B 33/0815* (2013.01); *H05B 37/02* (2013.01)

(58) Field of Classification Search
CPC . H05B 33/0845; H05B 33/0815; H05B 37/02
See application file for complete search history.

(56) References Cited

U.S. PATENT DOCUMENTS

| | | | | |
|---|---|---|---|---|
| 9,357,602 | B1* | 5/2016 | Chen ................. | H05B 33/0815 |
| 2009/0237007 | A1* | 9/2009 | Leng ................. | H05B 33/0815 |
| | | | | 315/297 |
| 2010/0289424 | A1* | 11/2010 | Chang ............... | H05B 33/0818 |
| | | | | 315/250 |
| 2011/0254469 | A1* | 10/2011 | Ruan ................. | H05B 33/0809 |
| | | | | 315/307 |
| 2012/0133291 | A1* | 5/2012 | Kitagawa ........... | H05B 33/0812 |
| | | | | 315/186 |
| 2012/0146531 | A1* | 6/2012 | Uchimoto .......... | H05B 33/0818 |
| | | | | 315/224 |
| 2012/0176050 | A1* | 7/2012 | Li ..................... | H05B 33/0815 |
| | | | | 315/192 |
| 2012/0181950 | A1* | 7/2012 | Yu ..................... | H05B 33/0815 |
| | | | | 315/294 |

(Continued)

*Primary Examiner* — Dylan C White
(74) *Attorney, Agent, or Firm* — Patterson + Sheridan, LLP

(57) ABSTRACT

In a LED driver, a dimming control circuit receives a PWM signal and a clock signal and outputs a dimming signal and a sampling signal. A turn-on time of sampling signal is shorter than a cycle of clock signal. A first error amplifier receives a feedback voltage, a reference voltage and a dimming signal and outputs a compensating voltage. A second error amplifier receives the compensating voltage and a ramp signal and outputs a pulse voltage. A driving controller receives the dimming signal and pulse voltage and outputs a control signal. An output stage receives the control signal and an input voltage and generates an output voltage to LED strings. A minimum voltage selecting unit selects a minimum LED voltage. The first error amplifier receives the minimum LED voltage through the selectively conducted switch unit controlled by the sampling signal.

11 Claims, 7 Drawing Sheets

(56) References Cited

U.S. PATENT DOCUMENTS

| | | | | |
|---|---|---|---|---|
| 2013/0038233 A1* | 2/2013 | Chu | ............... | H05B 33/0815 |
| | | | | 315/224 |
| 2013/0278145 A1* | 10/2013 | Lin | ............... | H05B 33/0851 |
| | | | | 315/122 |
| 2016/0255693 A1* | 9/2016 | Wang | ............ | H05B 33/0812 |
| | | | | 315/185 R |
| 2017/0187280 A1* | 6/2017 | Lee | ...................... | H02J 1/00 |

* cited by examiner

LIGHT-EMITTING DIODE DRIVER

BACKGROUND OF THE INVENTION

Field of the Invention

The invention relates to driving a light-emitting diode (LED); in particular, to a LED driver.

Description of the Related Art

In general, in the conventional LED display, the LED driver usually uses the pulse width modulation (PWM) signal to perform dimming to control the lightness of the plurality of LED strings.

However, once the duty cycle of the pulse width modulation signal PWM used in the LED driver is too small, namely under the condition that the turn-on time of the pulse width modulation signal PWM is far smaller than the turn-off time, ripples will be occurred in the output voltage VOUT of the LED driver, as shown in FIG. 1. And, FIG. 1A shows an enlarging diagram of the dotted line region in FIG. 1. As a result, the LED current ILED will be affected by the ripples in the output voltage VOUT and becomes unstable, and the light-emitting stability of the LED display will also become poor.

SUMMARY OF THE INVENTION

Therefore, the invention provides a LED driver to overcome the above-mentioned problems in the prior art.

An embodiment of the invention is a LED driver. In this embodiment, the light-emitting diode (LED) driver is used for driving a plurality of LED strings. The LED driver includes a dimming control circuit, a first error amplifier, a second error amplifier, a driving controller, an output stage, a minimum voltage selecting unit and a switch unit. The dimming control circuit is used for receiving a pulse width modulation (PWM) signal and a clock signal and outputting a dimming signal and a sampling signal, wherein a turn-on time of the sampling signal at high-level is shorter than a clock cycle of the clock signal. The first error amplifier is coupled to the dimming control circuit and used for receiving a feedback voltage, a reference voltage and the dimming signal respectively and outputting a compensating voltage. The second error amplifier is coupled to the first error amplifier and used for receiving the compensating voltage and a ramp signal respectively and outputting a pulse voltage. The driving controller is coupled to the dimming control circuit and the second error amplifier and used for receiving the dimming signal and the pulse voltage respectively and outputting a control signal. The output stage is coupled to the driving controller, a first terminal of the plurality of LED strings, an input voltage and a ground terminal respectively and used for receiving the control signal and the input voltage and generating an output voltage to the plurality of LED strings, wherein a plurality of LED currents flows from the first terminal of the plurality of LED strings to a second terminal of the plurality of LED strings respectively. The minimum voltage selecting unit is coupled to the second terminal of the plurality of LED strings and used for sensing a plurality of LED voltages at the second terminal of the plurality of LED strings and selecting a minimum LED voltage from the plurality of LED voltages. The switch unit is coupled to the dimming control circuit, the first error amplifier and the minimum voltage selecting unit respectively. The switch unit is controlled by the sampling signal to selectively conduct the minimum voltage selecting unit and the first error amplifier, so that the first error amplifier receiving the minimum LED voltage from the minimum voltage selecting unit.

In an embodiment, when the sampling signal is at high-level, the switch unit is controlled by the sampling signal to conduct the minimum voltage selecting unit and the first error amplifier.

In an embodiment, when the plurality of LED currents is larger than 0, the sampling signal is at high-level.

In an embodiment, when the dimming signal is at low-level, the driving controller is activated by the dimming signal to output the control signal.

In an embodiment, the turn-on time and a period of time that the dimming signal is at low-level are separated, so that when the plurality of LED currents is larger than 0, the driving controller is not activated.

In an embodiment, the output stage includes an inductor, a transistor and a diode, a gate of the transistor is coupled to the driving controller and controlled by the control signal; the inductor and the transistor are coupled between the input voltage and the ground terminal; a LED driving signal is generated between the inductor and the transistor according to the control signal, and the diode receives the LED driving signal and outputs the output voltage.

In an embodiment, when the dimming signal is at low-level, the control signal and the LED driving signal are phase-reversed pulse signals.

In an embodiment, when the first error amplifier receives the dimming signal, an output of the first error amplifier is in a high-resistance state controlled by the dimming signal to keep a voltage value of the compensating voltage outputted by the first error amplifier unchanged.

In an embodiment, the dimming control circuit further receives an enabling signal, and the dimming control circuit includes an AND gate for adding the enabling signal and the PWM signal to form the sampling signal.

In an embodiment, the dimming control circuit further includes a plurality of flip-flops for generating a plurality of clock input signals according to the clock signal.

In an embodiment, the dimming control circuit further receives a selecting signal, and the dimming control circuit further includes a multiplexer for generating the dimming signal according to a part of the plurality of clock input signals, the sampling signal and the selecting signal.

Compared to the prior arts, under the condition that the duty cycle of the PWM signal is too small, the LED driver of the invention uses the dimming control circuit to output the sampling signal and the dimming signal respectively to achieve the following effects:

(1) using the sampling signal to selectively conduct the switch unit disposed between the error amplifier and the minimum voltage selecting unit, so that only when the LED current is larger than 0, the error amplifier will receive the minimum LED voltage to further generate the correct compensating voltage;

(2) only when the dimming signal is at low-level, the driving controller will be activated by the dimming signal and emit pulse voltages to provide enough charges to the output voltage to maintain the stable output voltage;

(3) since the period of time that the driving controller is activated by the dimming signal at low-level and the period of time that the LED current is larger than 0 are separated, the LED current will not affected by the noises generated when the driving controller is activated to maintain the stable LED current; and (4) since the output of the first error amplifier will be in the high-Z state controlled by the dimming signal, the voltage value of the compensating voltage generated by the first error amplifier can be maintained unchanged under the condition of open-circuit.

The advantage and spirit of the invention may be understood by the following detailed descriptions together with the appended drawings.

DETAILED DESCRIPTION

A preferred embodiment of the invention is a light-emitting diode (LED) driver. In this embodiment, the LED driver is used in a LED display for driving a plurality of LED strings in a LED display, but not limited to this.

Figures 1, 1A:
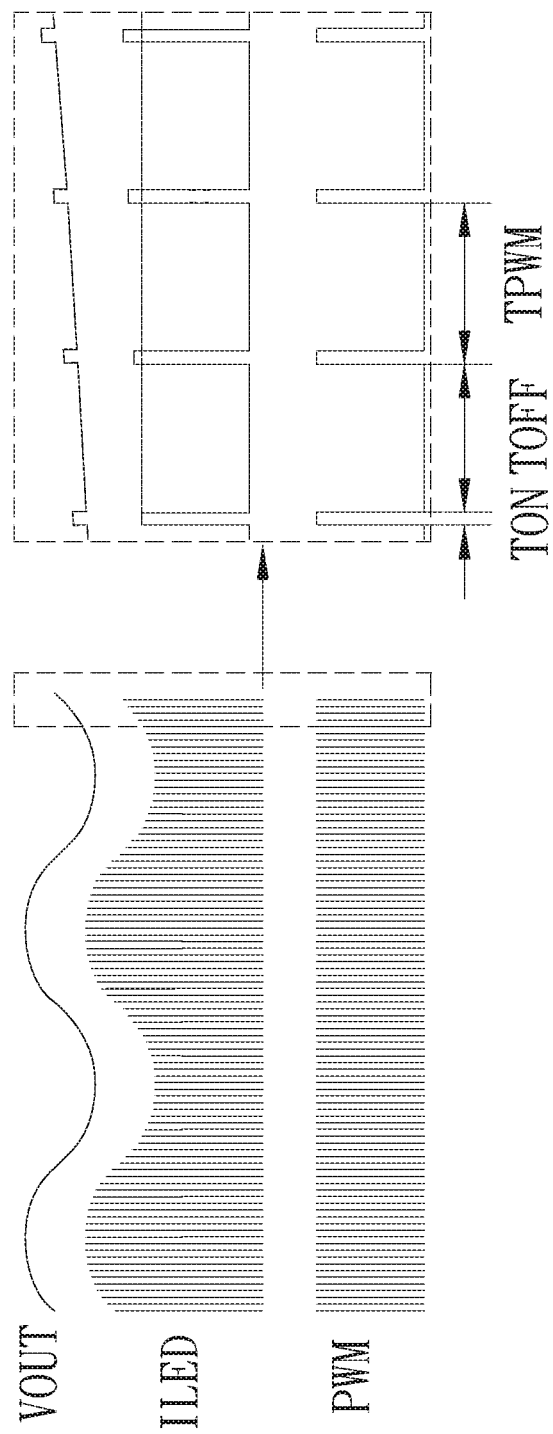
FIG. 1 illustrates a schematic diagram of the ripples occurred in the output voltage VOUT of the conventional LED driver in the prior art.
FIG. 1A illustrates an enlarging diagram of the dotted line region in FIG. 1.
Figure 2:
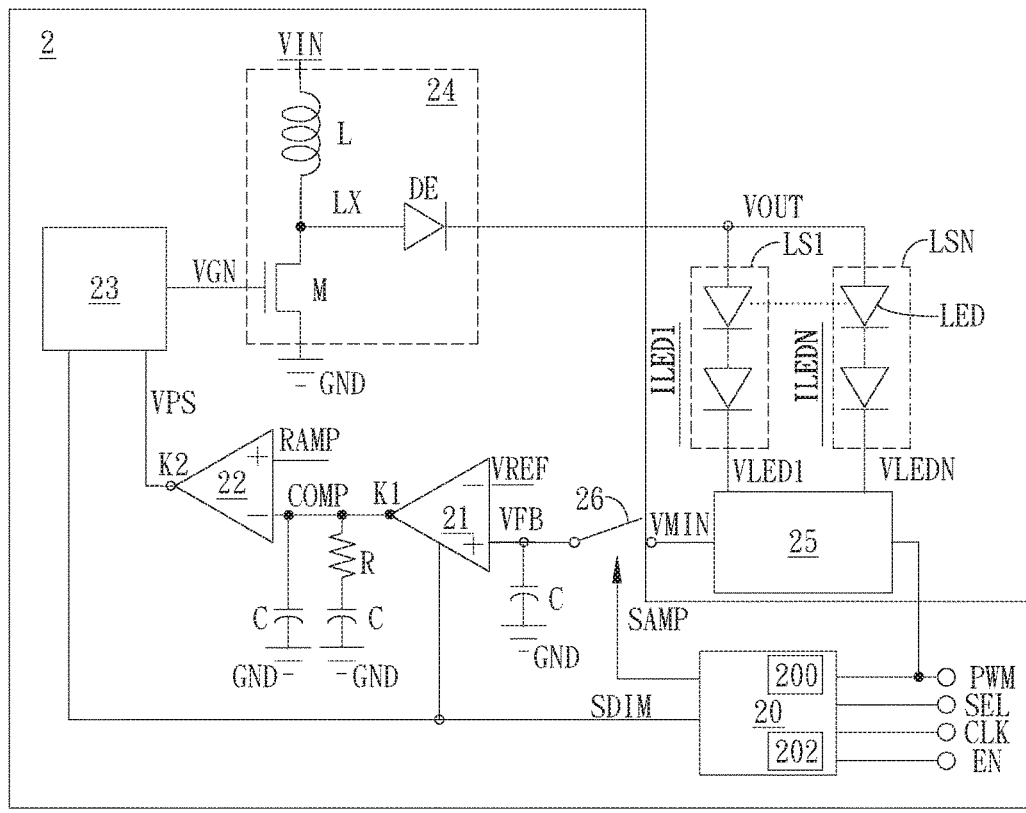
FIG. 2 illustrates a schematic diagram of the LED driver in an embodiment of the invention.

Please refer to FIG. 2. FIG. 2 illustrates a schematic diagram of the LED driver in this embodiment. As shown in FIG. 2, the LED driver 2 includes a dimming control circuit 20, a first error amplifier 21, a second error amplifier 22, a driving controller 23, an output stage 24, a minimum voltage selecting unit 25 and a switch unit 26. Wherein, the dimming control circuit 20 is coupled to the first error amplifier 21, the driving controller 23 and the switch unit 26 respectively; the first error amplifier 21 is coupled to the switch unit 26 and the second error amplifier 22 respectively; the second error amplifier 22 is coupled to the first error amplifier 21 and the driving controller 23 respectively; the driving controller 23 is coupled to the dimming control circuit 20, the second error amplifier 22 and the output stage 24 respectively; the output stage 24 is coupled to the driving controller 23, an input voltage VIN, a ground terminal GND and a first terminal of the plurality of LED strings LS1~LSN respectively; the minimum voltage selecting unit 25 is coupled to a second terminal of the plurality of LED strings LS1~LSN and the switch unit 26 respectively; the switch unit 26 is coupled to the dimming control circuit 20, the first error amplifier 21 and the minimum voltage selecting unit 25 respectively.

The dimming control circuit 20 is used to receive a pulse width modulation signal PWM, a clock signal CLK, a selecting signal SEL and an enabling signal EN respectively and output a dimming signal SDIM and a sampling signal SAMP respectively. In this embodiment, the dimming control circuit 20 can include a sampling signal generating module 200 and a dimming signal generating module 202. A turn-on time of the sampling signal SAMP at high-level is shorter than a clock cycle of the clock signal CLK.

The first error amplifier 21 is controlled by the dimming signal SDIM and used to receive a feedback voltage VFB and a reference voltage VREF through its positive input terminal + and negative input terminal − respectively and output a compensating voltage COMP through its output terminal K1. In this embodiment, one terminal of a capacitor C is coupled between the positive input terminal + of the first error amplifier 21 and the switch unit 26 and another terminal of the capacitor C is coupled to the ground terminal GND.

The second error amplifier 22 is used to receive a ramp signal RAMP and the compensating voltage COMP through its positive input terminal + and negative input terminal − respectively and output a pulse voltage VPS through its output terminal K2. In this embodiment, one terminal of a resistor R and a capacitor C coupled in series is coupled between the negative input terminal − of the second error amplifier 22 and the output terminal K1 of the first error amplifier 21 and another terminal of the resistor R and the capacitor C coupled in series is coupled to the ground terminal GND.

The driving controller 23 is used to receive the dimming signal SDIM and the pulse voltage VPS respectively and output a control signal VGN. It should be noticed that the driving controller 23 is activated to output the control signal VGN only when the dimming signal SDIM is at low-level. That is to say, the driving controller 23 is only activated by the dimming signal SDIM at low-level to output the control signal VGN.

The output stage 24 is used to receive the control signal VGN and the input voltage VIN respectively and generate an output voltage VOUT to the plurality of LED strings LS1~LSN, and a plurality of LED currents ILED1~ILEDN flows from a first terminal of the plurality of LED strings LS1~LSN to a second terminal of the plurality of LED strings LS1~LSN respectively. In this embodiment, the output stage 24 includes an inductor L, a transistor M and a diode DE. A gate of the transistor M is coupled to the driving controller 23 and controlled by the control signal VGN. The inductor L and the transistor M are coupled between the input voltage VIN and the ground terminal GND. A LED driving signal LX is generated between the inductor L and the transistor M according to the control signal VGN, and the diode DE receives the LED driving signal LX and outputs the output voltage VOUT.

The minimum voltage selecting unit 25 is used to sense a plurality of LED voltages VLED1~VLEDN at the second terminal of the plurality of LED strings LS1~LSN respectively and then select a minimum LED voltage VMIN from the plurality of LED voltages VLED1~VLEDN.

The switch unit 26 is controlled by the sampling signal SAMP to selectively conduct the minimum voltage selecting unit 25 and the positive input terminal + of the first error amplifier 21, so that the first error amplifier 21 can receive the minimum LED voltage VMIN through its positive input terminal +.

Figure 3:
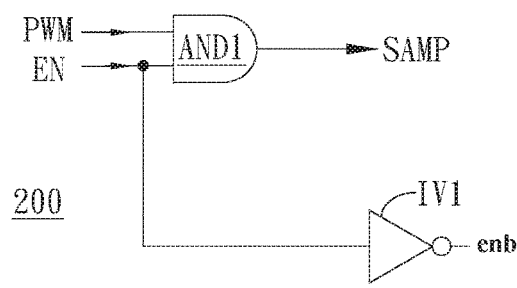
FIG. 3 illustrates an embodiment of the sampling signal generating module in the dimming control circuit.

Please refer to FIG. 3. FIG. 3 illustrates an embodiment of the sampling signal generating module 200 in the dimming control circuit 20. As shown in FIG. 3, the sampling signal generating module 200 can include an AND gate AND1 and an inverter IV1. The AND gate AND1 is used for adding the enabling signal EN and the PWM signal PWM to form the sampling signal SAMP. The inverter IV1 is used to generate a reversed-phase enabling signal enb according to the enabling signal EN. By doing so, the sampling signal generating module 200 can smoothly generate the sampling signal SAMP according to the enabling signal EN and the PWM signal PWM for selectively controlling the operation of the switch unit 26.

Figure 4:
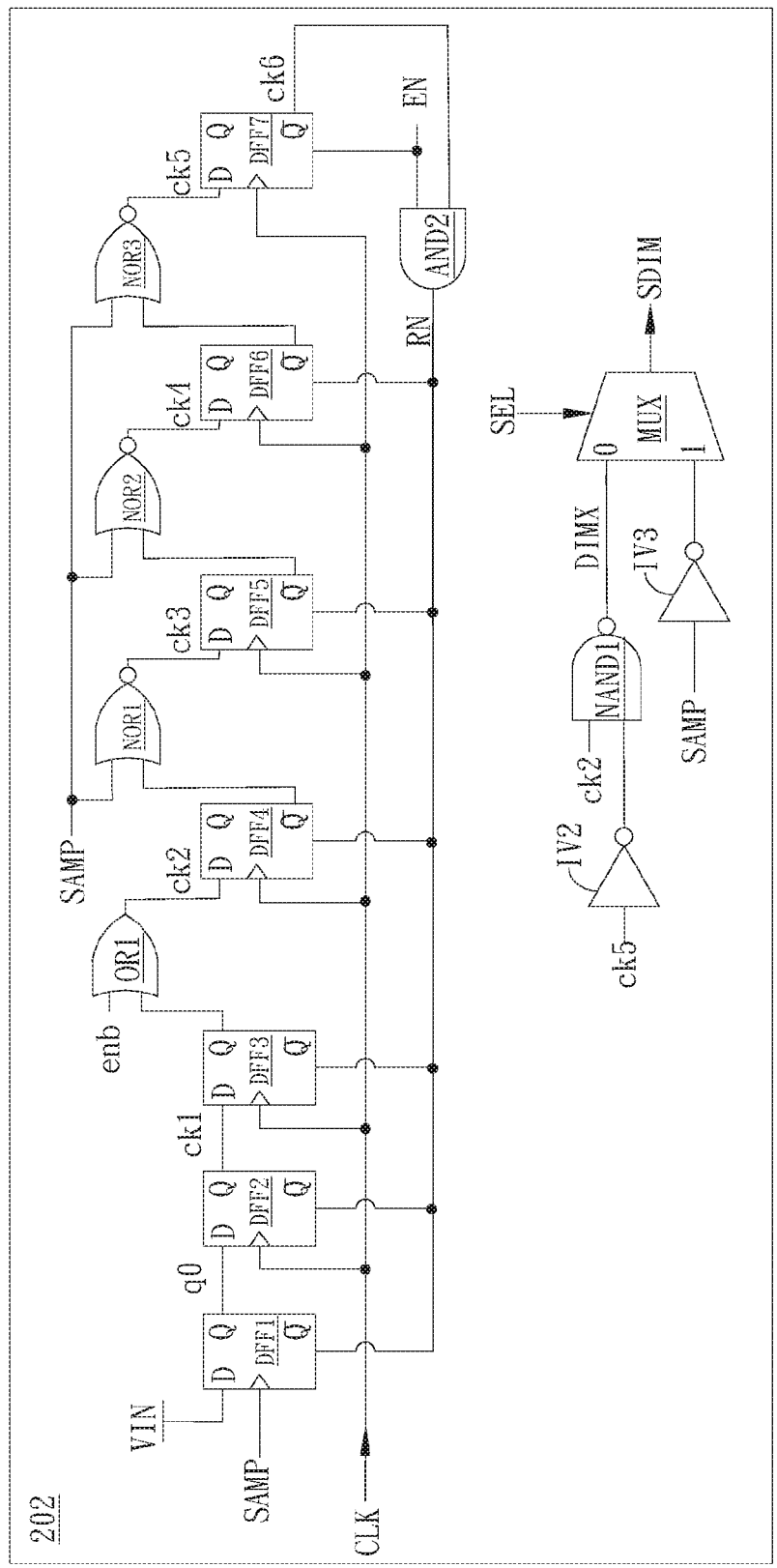
FIG. 4 illustrates an embodiment of the dimming signal generating module in the dimming control circuit.

Please refer to FIG. 4. FIG. 4 illustrates an embodiment of the dimming signal generating module 202 in the dimming control circuit 20. As shown in FIG. 4, the dimming signal generating module 202 can include a plurality of logic devices such as flip-flops DFF1~DFF7, an OR gate OR1, NOR gates NOR1~NOR3, an AND gate AND2, inverters IV2~IV3, a NAND gate NAND1 and a multiplexer MUX, but not limited to this.

In this embodiment, the flip-flop DFF1 receives the input voltage VIN and the sampling signal SAMP respectively and outputs an indicating signal q0; the flip-flop DFF2 receives the clock signal CLK and the indicating signal q0 respectively and outputs a clock input signal ck1; the flip-flop DFF3 receives the clock signal CLK and the clock input signal ck1 respectively and its output terminal is coupled to an input terminal of the OR gate OR1, and another input terminal of the OR gate OR1 receives the reversed-phase enabling signal enb and an output terminal of the OR gate OR1 outputs a clock input signal ck2; the flip-flop DFF4 receives the clock signal CLK and the clock input signal ck2 respectively and its output terminal is coupled to an input terminal of the NOR gate NOR1, and another input terminal of the NOR gate NOR1 receives the sampling signal SAMP and an output terminal of the NOR gate NOR1 outputs a clock input signal ck3; the flip-flop DFF5 receives the clock signal CLK and the clock input signal ck3 respectively and its output terminal is coupled to an input terminal of the NOR gate NOR2, and another input terminal of the NOR gate NOR2 receives the sampling signal SAMP and an output terminal of the NOR gate NOR2 outputs a clock input signal ck4; the flip-flop DFF6 receives the clock signal CLK and the clock input signal ck4 respectively and its output terminal is coupled to an input terminal of the NOR gate NOR3, and another input terminal of the NOR gate NOR3 receives the sampling signal SAMP and an output terminal of the NOR gate NOR3 outputs a clock input signal ck5; the flip-flop DFF7 receives the clock signal CLK and the clock input signal ck5 respectively and outputs a clock input signal ck6; the AND gate AND2 receives the enabling signal EN and the clock input signal ck6 and outputs a reversed-phase signal RN to the flip-flops DFF1~DFF6.

An input terminal of the inverter IV2 receives the clock input signal ck5 and its output terminal is coupled to an input terminal of the NAND gate NAND1, and another input terminal of the NAND gate NAND1 receives the clock input signal ck2 and an output terminal of the NAND gate NAND1 outputs a dimming signal DIMX to an input terminal 0 of the multiplexer MUX; an input terminal of the inverter IV3 receives the sampling signal SAMP and its output terminal is coupled to another input terminal 1 of the multiplexer MUX; the multiplexer MUX is controlled by the selecting signal SEL to generate the dimming signal SDIM according to the dimming signal DIMX and a reversed-phase signal of the sampling signal SAMP. By doing so, the dimming signal generating module 202 can smoothly generate the dimming signal SDIM according to the PWM signal PWM, the enabling signal EN, the clock signal CLK and the selecting signal SEL and then output the dimming signal SDIM to the first error amplifier 21 and the driving controller 23 respectively.

Then, please refer to FIG. 5~FIG. 8. FIG. 5~FIG. 8 illustrate timing diagrams of the signals when the PWM signals with different duty cycles are used in the LED driver 2 respectively.

Figure 5:
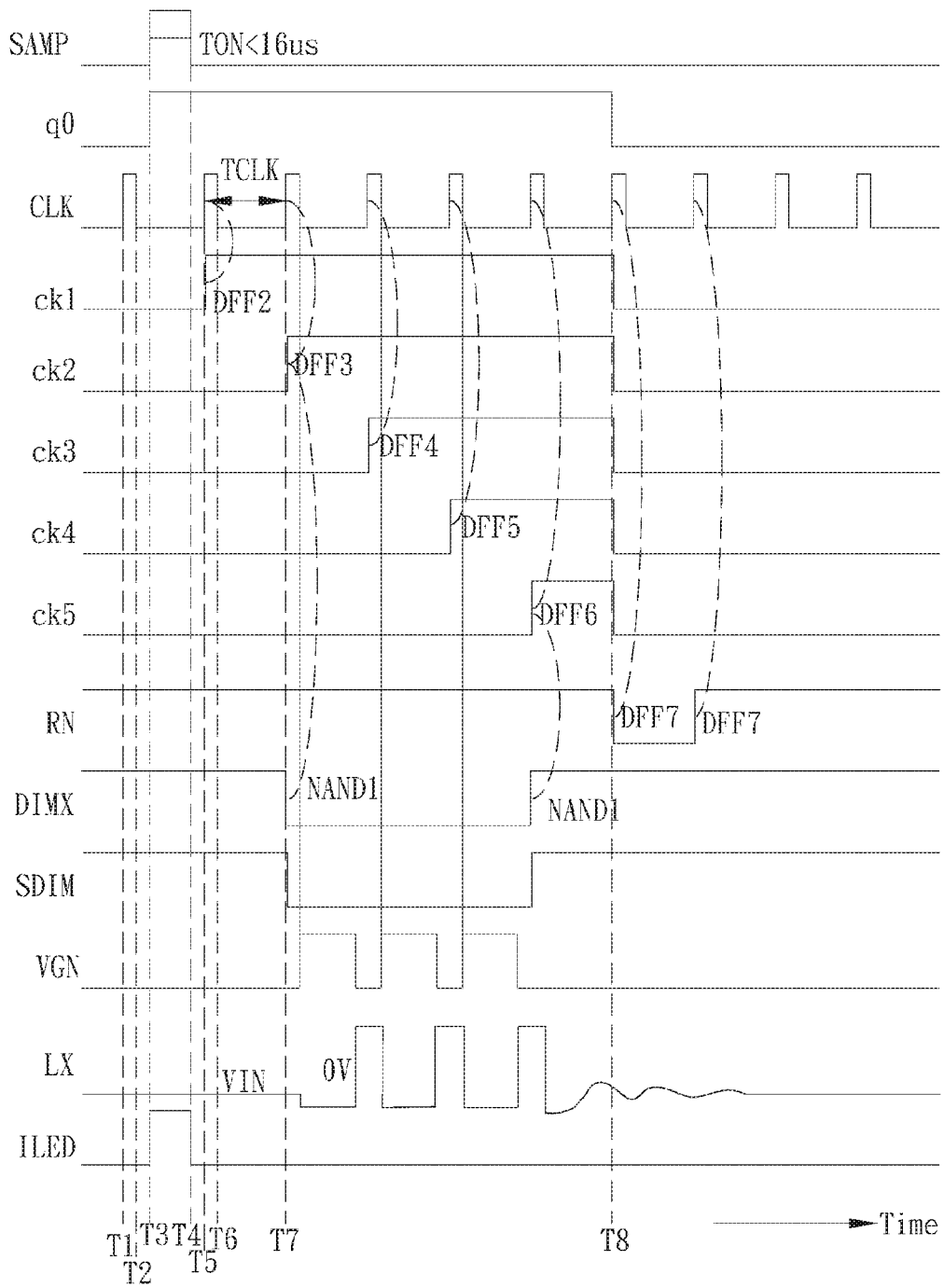
FIG. 5~FIG. 8 illustrate timing diagrams of the signals when the PWM signals with different duty cycles are used in the LED driver respectively

In a preferred embodiment of the invention, as shown in FIG. 5, the turn-on time TON of the sampling signal SAMP at high-level is shorter than the clock cycle TCLK of the clock signal CLK. It is assumed that the frequency of the clock signal CLK is 1 MHz and the clock cycle TCLK is 1 us, the frequency of the PWM signal is 25 KHz and the cycle TPWM of the PWM signal PWM is 40 us. Since the turn-on time TON of the sampling signal SAMP is shorter than 16 us, the selecting signal SEL will be at low-level, but not limited to this.

In this embodiment, at the time T1, the clock signal CLK is changed from low-level to high-level and then maintained at high-level for a period of time; at the time T2, the clock signal CLK is changed from high-level to low-level. During the period between the times T1 and T2, the sampling signal SAMP is maintained at low-level and the LED current ILED is also maintained at low-level.

Next, at the time T3, the sampling signal SAMP is changed from low-level to high-level and then maintained at high-level for a period of time; at the time T4, the sampling signal SAMP is changed from high-level to low-level. Similarly, the LED current ILED is also changed from low-level to high-level and then maintained at high-level for a period of time; at the time T4, the LED current ILED is changed from high-level to low-level. During the period between the times T3 and T4, the clock signal CLK is maintained at low-level and the indicating signal q0 generated by the flip-flop DFF1 in FIG. 4 according to the input voltage VIN and the sampling signal SAMP will be changed from low-level to high-level at the time T3 and then maintained at high-level.

Then, at the time T5, the clock signal CLK is changed from low-level to high-level and then maintained at high-level for a period of time; at the time T6, the clock signal CLK is changed from high-level to low-level. And, the clock input signal ck1 generated by the flip-flop DFF2 in FIG. 4 according to the clock signal CLK and the indicating signal q0 will be changed from low-level to high-level at the time T5 and then maintained at high-level. During the period between the times T5 and T6, the sampling signal SAMP is maintained at low-level and the LED current ILED is also maintained at low-level.

At the time T7, the clock signal CLK is changed from low-level to high-level and the clock input signal ck2 generated by the flip-flop DFF3 in FIG. 4 according to the clock signal CLK and the clock input signal ck1 will be also changed from low-level to high-level. And, the dimming signal SDIM originally maintained at high-level is changed to low-level at the time T7 and then maintained at low-level.

As to the clock input signal ck3 generated by the flip-flop DFF4 in FIG. 4 according to the clock signal CLK and the clock input signal ck2, the clock input signal ck4 generated by the flip-flop DFF5 in FIG. 4 according to the clock signal CLK and the clock input signal ck3 and the clock input signal ck5 generated by the flip-flop DFF6 in FIG. 4 according to the clock signal CLK and the clock input signal ck4, they will be also changed from low-level to high-level in order. In addition, the indicating signal q0 and the clock input signals ck1~ck5 are changed from high-level to low-level at the time T8; the reversed-phase signal RN originally maintained at high-level is also changed from high-level to low-level at the time T8.

When the dimming signal SDIM is changed from high-level to low-level, the driving controller 23 will be activated by the dimming signal SDIM at low-level to output the control signal VGN. In practical applications, the control signal VGN can include three pulse voltage signals as shown in FIG. 5, but not limited to this. And, the LED driving signal LX and the control signal VGN have reversed phases. In practical applications, the LED driving signal LX can include three pulse voltage signals as shown in FIG. 5 to provide enough charges to the output voltage VOUT when the turn-on time TON is very short to make the output voltage VOUT stable, but not limited to this.

In addition, since the period that the driving controller 23 is activated by the dimming signal SDIM at low-level is separated from the period that the LED current ILED is larger than 0 (namely the turn-on time TON), the LED current ILED will not affected by the noise generated when the driving controller 23 is activated by the dimming signal SDIM at low-level; therefore, stable LED current ILED can be maintained.

Figure 6:
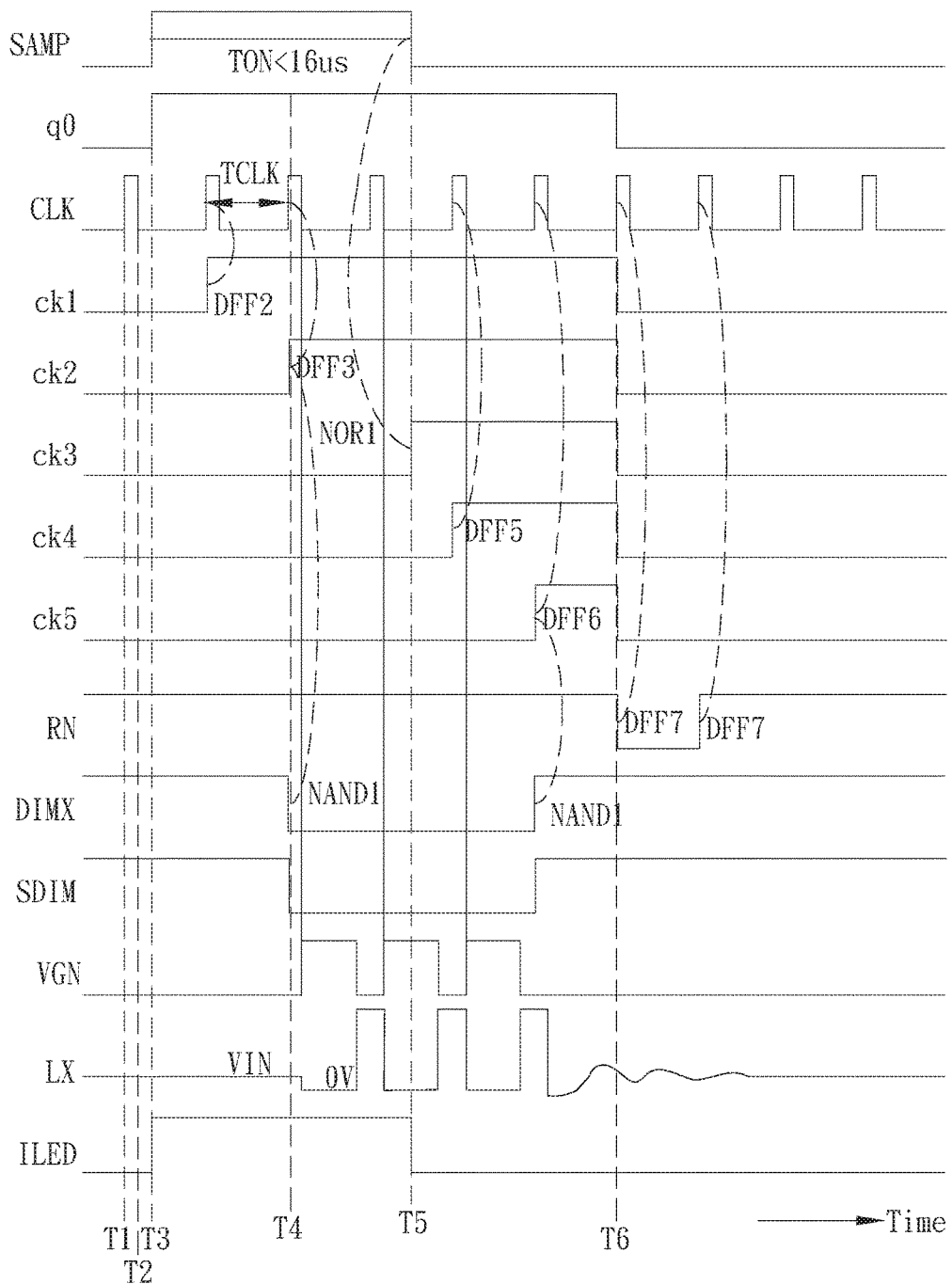
Figure 7:
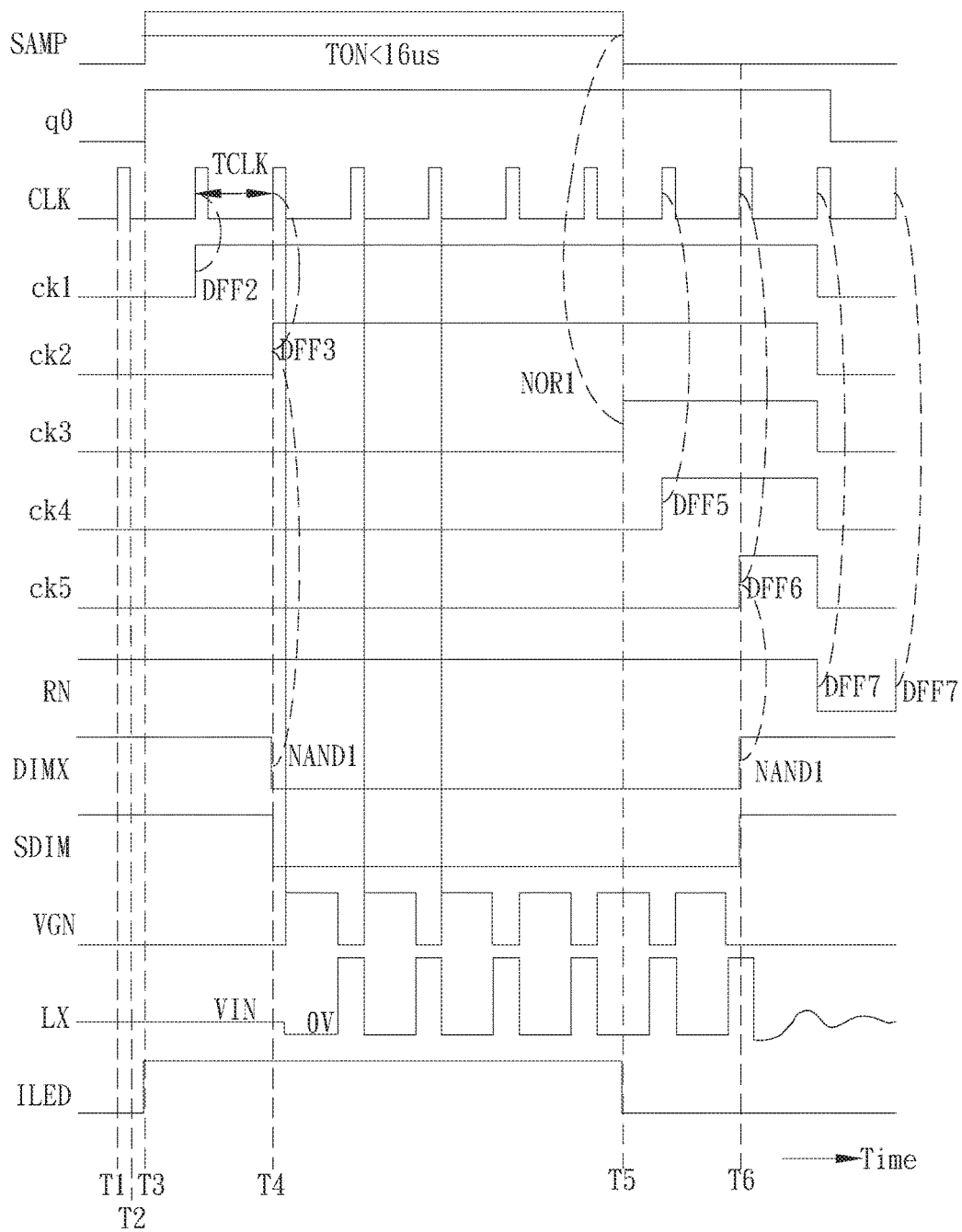
Figure 8:
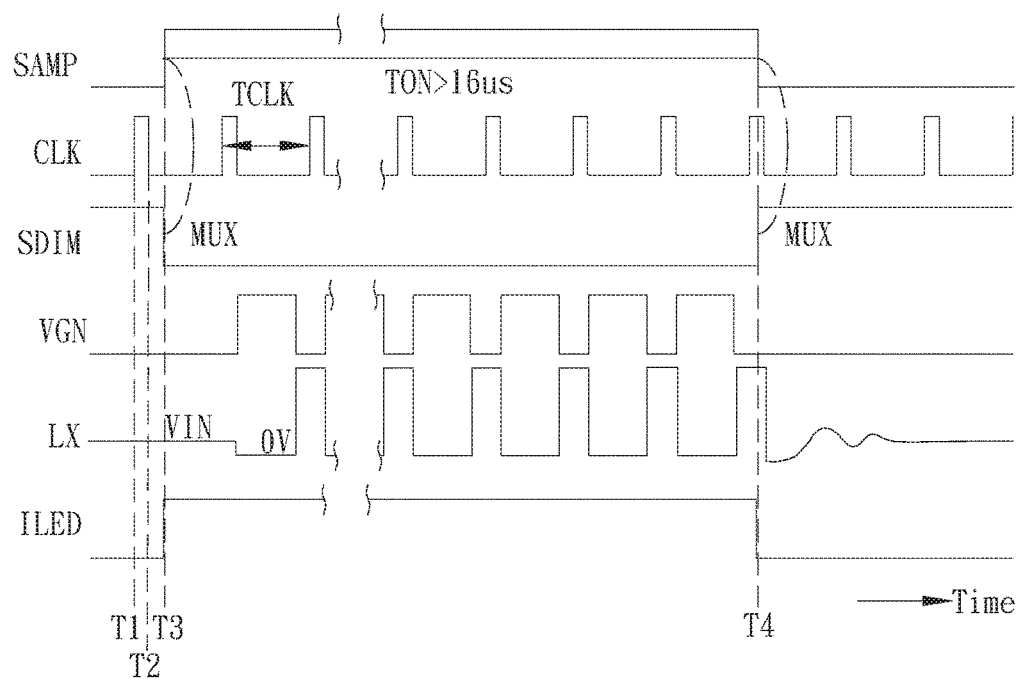

Then, please refer to FIG. 6~FIG. 8. FIG. 6~FIG. 8 illustrate different embodiments of the turn-on time TON of the sampling signal SAMP at high-level longer than the clock cycle TCLK of the clock signal CLK.

In the embodiment shown in FIG. 6, it is assumed that the frequency of the clock signal CLK is 1 MHz and the clock cycle TCLK is 1 ms, the frequency of the PWM signal PWM is 25 KHz and the cycle of the PWM signal PWM is 40 us, the turn-on time TON is 3 us equal to 7.5% of the duty cycle of the PWM signal PWM. Since the turn-on time TON (3 us) is shorter than 16 us, the selecting signal SEL is at low-level, but not limited to this.

In the embodiment shown in FIG. 7, it is assumed that the frequency of the clock signal CLK is 1.2 MHz and the clock cycle TCLK is 0.833 ms, the frequency of the PWM signal PWM is 25 KHz and the cycle of the PWM signal PWM is 40 us, the turn-on time TON is 6 us equal to 15% of the duty cycle of the PWM signal PWM. Since the turn-on time TON (6 us) is shorter than 16 us, the selecting signal SEL is at low-level, but not limited to this.

In the embodiment shown in FIG. 8, it is assumed that the frequency of the clock signal CLK is 1.2 MHz and the clock cycle TCLK is 0.833 ms, the frequency of the PWM signal PWM is 25 KHz and the cycle of the PWM signal PWM is 40 us, the turn-on time TON is 16 us equal to 40% of the duty cycle of the PWM signal PWM. Since the turn-on time TON is equal to 16 us, the selecting signal SEL is at high-level, but not limited to this.

Compared to the prior arts, under the condition that the duty cycle of the PWM signal is too small, the LED driver of the invention uses the dimming control circuit to output the sampling signal and the dimming signal respectively to achieve the following effects:

(1) using the sampling signal to selectively conduct the switch unit disposed between the error amplifier and the minimum voltage selecting unit, so that only when the LED current is larger than 0, the error amplifier will receive the minimum LED voltage to further generate the correct compensating voltage;

(2) only when the dimming signal is at low-level, the driving controller will be activated by the dimming signal and emit pulse voltages to provide enough charges to the output voltage to maintain the stable output voltage;

(3) since the period of time that the driving controller is activated by the dimming signal at low-level and the period of time that the LED current is larger than 0 are separated, the LED current will not affected by the noises generated when the driving controller is activated to maintain the stable LED current; and (4) since the output of the first error amplifier will be in the high-Z state controlled by the dimming signal, the voltage value of the compensating voltage generated by the first error amplifier can be maintained unchanged under the condition of open-circuit.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

The invention claimed is:

1. A light-emitting diode (LED) driver, for driving a plurality of LED strings, the LED driver comprising:
a dimming control circuit, for receiving a pulse width modulation (PWM) signal and a clock signal and outputting a dimming signal and a sampling signal, wherein a turn-on time of the sampling signal at high-level is shorter than a clock cycle of the clock signal;
a first error amplifier, coupled to the dimming control circuit, for receiving a feedback voltage, a reference voltage and the dimming signal respectively and outputting a compensating voltage;
a second error amplifier, coupled to the first error amplifier, for receiving the compensating voltage and a ramp signal respectively and outputting a pulse voltage;
a driving controller, coupled to the dimming control circuit and the second error amplifier, for receiving the dimming signal and the pulse voltage respectively and outputting a control signal;
an output stage, coupled to the driving controller, a first terminal of the plurality of LED strings, an input voltage and a ground terminal respectively, for receiving the control signal and the input voltage and generating an output voltage to the plurality of LED strings, wherein a plurality of LED currents flows from the first terminal of the plurality of LED strings to a second terminal of the plurality of LED strings respectively;
a minimum voltage selecting unit, coupled to the second terminal of the plurality of LED strings, for sensing a plurality of LED voltages at the second terminal of the plurality of LED strings and selecting a minimum LED voltage from the plurality of LED voltages; and
a switch unit, coupled to the dimming control circuit, the first error amplifier and the minimum voltage selecting unit respectively and controlled by the sampling signal, for selectively conducting the minimum voltage selecting unit and the first error amplifier, so that the first error amplifier receiving the minimum LED voltage from the minimum voltage selecting unit.

2. The LED driver of claim 1, wherein when the sampling signal is at high-level, the switch unit is controlled by the sampling signal to conduct the minimum voltage selecting unit and the first error amplifier.

3. The LED driver of claim 1, wherein when the plurality of LED currents is larger than 0, the sampling signal is at high-level.

4. The LED driver of claim 1, wherein when the dimming signal is at low-level, the driving controller is activated by the dimming signal to output the control signal.

5. The LED driver of claim 4, wherein the turn-on time and a period of time that the dimming signal is at low-level are separated, so that when the plurality of LED currents is larger than 0, the driving controller is not activated.

6. The LED driver of claim 1, wherein the output stage comprises an inductor, a transistor and a diode, a gate of the transistor is coupled to the driving controller and controlled by the control signal; the inductor and the transistor are coupled between the input voltage and the ground terminal; a LED driving signal is generated between the inductor and the transistor according to the control signal, and the diode receives the LED driving signal and outputs the output voltage.

7. The LED driver of claim 6, wherein when the dimming signal is at low-level, the control signal and the LED driving signal are phase-reversed pulse signals.

8. The LED driver of claim 1, wherein when the first error amplifier receives the dimming signal, an output of the first error amplifier is in a high-resistance state controlled by the dimming signal to keep a voltage value of the compensating voltage outputted by the first error amplifier unchanged.

9. The LED driver of claim 1, wherein the dimming control circuit further receives an enabling signal, and the dimming control circuit comprises an AND gate for adding the enabling signal and the PWM signal to form the sampling signal.

10. The LED driver of claim 9, wherein the dimming control circuit further comprises a plurality of flip-flops for generating a plurality of clock input signals according to the clock signal.

11. The LED driver of claim 10, wherein the dimming control circuit further receives a selecting signal, and the dimming control circuit further comprises a multiplexer for generating the dimming signal according to a part of the plurality of clock input signals, the sampling signal and the selecting signal.

\* \* \* \* \*